US008478783B2

(12) United States Patent
Cannon et al.

(10) Patent No.: US 8,478,783 B2

(45) Date of Patent: Jul. 2, 2013

(54) ORDERING CONTENT IN SOCIAL NETWORKING APPLICATIONS

(75) Inventors: Ulysses L. Cannon, Durham, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/461,769

(22) Filed: May 1, 2012

(65) Prior Publication Data

US 2012/0278730 A1 Nov. 1, 2012

Related U.S. Application Data

(63) Continuation of application No. 12/192,576, filed on Aug. 15, 2008, now Pat. No. 8,190,639.

(51) Int. Cl.
*G06F 17/30* (2006.01)

(52) U.S. Cl.
USPC ........... 707/785; 707/705; 707/802; 709/203; 705/319

(58) Field of Classification Search
USPC ................. 707/783, 784, 805, 705, 717, 785, 707/802; 709/203; 705/319; 715/234
See application file for complete search history.

(56) References Cited

U.S. PATENT DOCUMENTS

| | | | |
|---|---|---|---|
| 2007/0169165 | A1 | 7/2007 | Crull et al. |
| 2008/0134052 | A1 | 6/2008 | Davis et al. |
| 2009/0171691 | A1 | 7/2009 | Lubarski et al. |
| 2010/0031162 | A1 | 2/2010 | Wiser et al. |

OTHER PUBLICATIONS

"U.S. Appl. No. 12/192,576 Office Action", Mar. 18, 2011, 7 pages.

*Primary Examiner* — Cheryl Lewis

(74) *Attorney, Agent, or Firm* — DeLizio Gilliam, PLLC

(57) ABSTRACT

Ordering content in social networking applications is described. A plurality of shared content pieces are received, that are viewable and accessible by at least one viewer, wherein the shared content pieces are configured for display in an initial order, wherein the shared content pieces are accessed in a viewer order determined by an individual viewer. The viewer order and the identity of the individual viewer are received and stored in a data store, and the initial order is changed based at least in part upon at least one of the viewer order and the identity of the individual viewer, thereby providing an adjusted order. The changing of the initial order is performed after a predetermined period of time and is based at least in part upon at least one of viewer orders and identities of individual viewers for a plurality of viewers in the data store.

23 Claims, 3 Drawing Sheets

Social Networking Site 108

Server 106

Network 104

Internet Browser 102

User Computer 100

ORDERING CONTENT IN SOCIAL NETWORKING APPLICATIONS

RELATED APPLICATIONS

This application claims the priority benefit of United States of America application Ser. No. 12/192,576, U.S. Pat. No. 8,190,639, filed Aug. 15, 2008.

BACKGROUND

Social networking applications can be web-based applications that can allow users to create and publish shared content on their personal web pages. Shared content can include all types of digital media accessible by visitors to the personal web page, including text, web links, photographs, video content, and audio content. Using the social networking application, access to the shared content can be restricted to a subset of the users that can access the personal web page, which can itself be a subset of the users of the social networking application. Permission to access the shared content can be set by the owner of the personal web page, for example. In some social networking applications, photos, for example, contained within an album can be viewed, and tagged, by other users of the social networking application.

SUMMARY

Methods, systems, and computer readable media for ordering content in social networking applications are described. A plurality of shared content pieces are received, that are viewable and accessible by at least one viewer, wherein the shared content pieces are configured for display in an initial order, wherein the shared content pieces are accessed in a viewer order determined by an individual viewer. The viewer order and the identity of the individual viewer are received and stored in a data store, and the initial order is changed based at least in part upon at least one of the viewer order and the identity of the individual viewer, thereby providing an adjusted order. The changing of the initial order is performed after a predetermined period of time and is based at least in part upon at least one of viewer orders and identities of individual viewers for a plurality of viewers in the data store.

DESCRIPTION OF EMBODIMENT(S)

Processes, systems, and computer readable media for ordering content in social networking applications are described. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
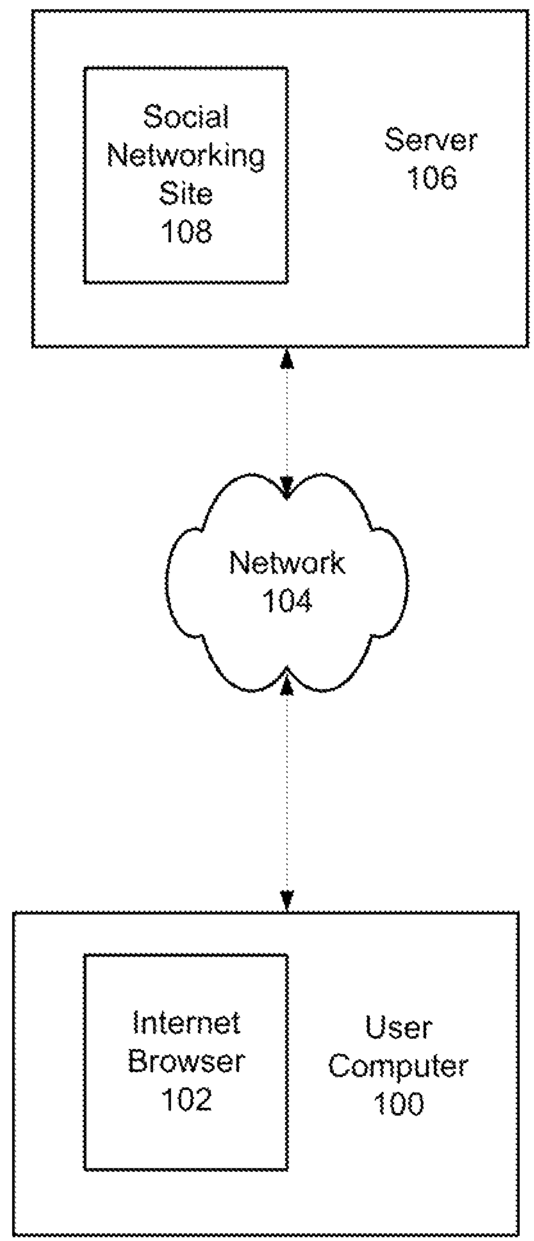
FIG. 1 illustrates an exemplary embodiment of a system that can order content in social networking applications.

FIG. 1 illustrates an exemplary embodiment of a system that can order content in social networking applications. The system can include a user computer 100, a network 104, and a server 106. The server 106 can include a social networking application site 108, which the user computer can access through the network 104 using a web browser 102, for example. The network 104 can be the Internet, or any other type of public or private wired or wireless network.

As described below, the system shown in FIG. 1 can be used to order content in the social networking application 108. Ordering content in social networking applications can cause content that is of greater interest to an individual or group of individuals to be more easily accessible to individuals browsing the content, thereby improving browsing efficiency of the content.

Figure 2:
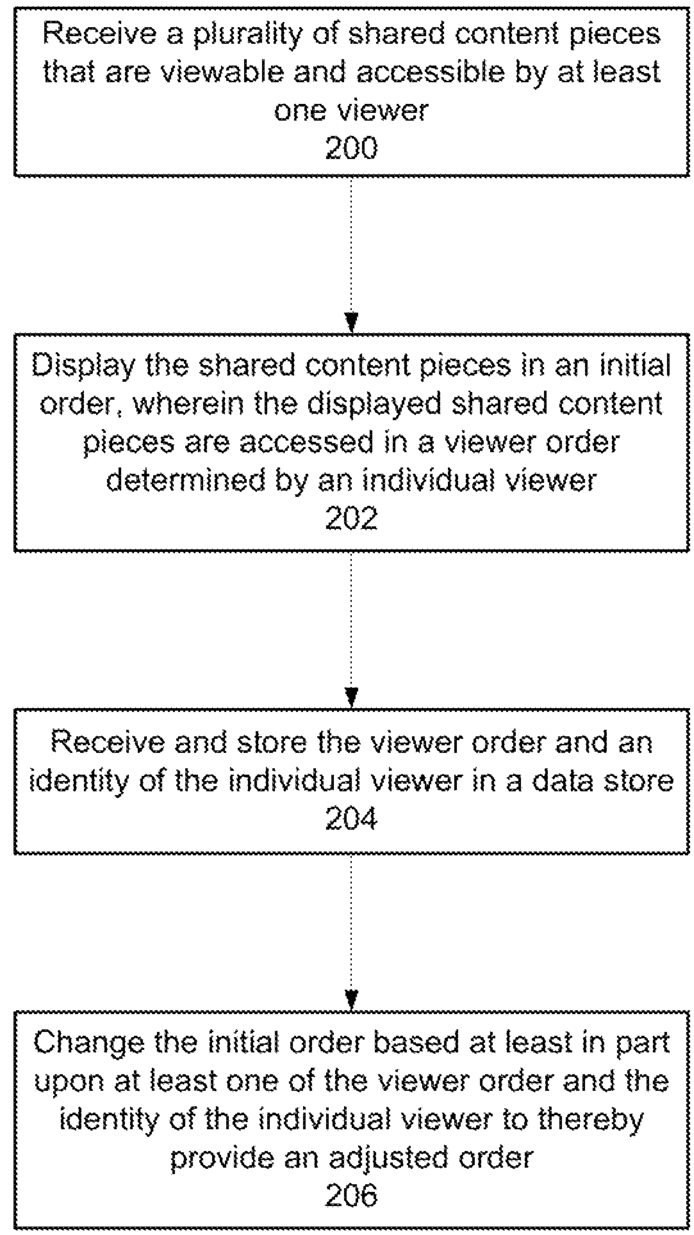
FIG. 2 illustrates an exemplary embodiment of a process for ordering content in social networking applications.

FIG. 2 illustrates an exemplary embodiment of a process for ordering content in social networking applications. A plurality of shared content pieces are received that are viewable and accessible by at least one viewer (block 200). The shared content pieces can be individually selectable content (e.g., images, files and/or web links) that can be accessed by at least one viewer. The shared content pieces can include all types of digital media accessible by viewers, including text, web links, digital photographs, digital video files, and digital audio files. The shared content pieces are viewable on an electronic visual display, and can be accessible from a personal web page, a web feed, a web service, or a stand-alone application on a portable device, for example.

For example, a personal web page owner can upload digital photographs, which are received on the owner's personal web page. The personal web page can be viewed by at least one viewer, which can be any person capable of accessing the personal web page (e.g., the personal web page owner's "friends"). The digital photographs are accessible by all of the personal web page owner's friends, or a subset thereof, based upon the preferences of the personal web page owner. The digital photographs can be organized into albums. The albums can be based upon certain themes, such as events (e.g., the personal web page owner's wedding), periods of time, people known by the personal web page owner, etc.

The shared content pieces are displayed in an initial order, wherein the displayed shared content pieces are accessed in a viewer order determined by an individual viewer (block 202). That is, the shared content pieces are displayed to the individual viewer in a sequence, wherein the viewer can selectively access individual shared content pieces in substantially any order the viewer chooses. For example, if the shared content pieces are digital photographs, the digital photographs can be displayed in a thumbnail display. Alternatively, the digital photographs can be displayed in a slideshow, wherein the viewer can choose to view the digital photographs by selecting a number that corresponds to a different photograph. The initial order can be the order that the personal web page owner uploaded the digital photographs onto the social networking site 108. The viewer order can be the order that the viewer elects to access (or view) the digital photographs.

In the example described above, the personal web page owner can have an album of digital photographs relating to a wedding. The digital photographs can have an initial order, which can be the order that they were taken, and can be displayed in a thumbnail display. The thumbnail display can be accessed, or enlarged on the viewer's display, in any order that the individual viewer determines. For example, the personal web page owner's sister may access the wedding album, and wish to enlarge digital photographs of the digital web page owner, which may be towards the bottom of the thumbnail display, or on a second or third page of the album, before viewing other digital photographs in the album. Therefore, the personal web page owner's sister would have a viewer order (e.g., photo 1, photo 30, photo 31, photo 32) that differs from the initial order (e.g., photo 1, photo 2, photo 3, photo 4) in which the photographs are displayed in the wedding album.

The viewer order and the identity of the individual viewer are received and stored in a data store (block 204). In one embodiment, the data store may comprise viewer-specific shared content files. However, in another embodiment, the data store may comprise a repository or a database, for example. In an exemplary embodiment, the identity of the individual viewer can include the viewer's name, the names of all of the viewer groups of social networking application users to which the viewer belongs (e.g., the schools attended by the viewer, and/or the organizations to which the viewer belongs), or any combination thereof. In the above-discussed example, the personal web page owner's sister's identity, including that she belonged to a "family" viewer group and a "hometown" viewer group, and her viewer order described above would be stored in a "sister" photo order file.

The initial order is changed based at least in part upon at least one of the viewer order and the identity of the individual viewer, thereby providing an adjusted order (block 206). In an exemplary embodiment, the adjusted order can be identical to the viewer order. For example, the sister photo order file would be used by the social networking application to change the order of the first four digital photographs in the wedding album thumbnail display to be photo 1, photo 30, photo 31, and photo 32.

By providing an adjusted order for displaying the shared content pieces based upon viewer behavior, which can be described by the viewer order and the identity of the individual viewer, a more functional order can be provided that improves viewing efficiency. Viewing efficiency can be improved both by reducing time spent on viewing pieces of shared content that are not of community interest and by moving pieces of shared content that are of community interest to be more easily accessible to viewers.

The changing the initial order can be performed by determining a frequency that each shared content pieces is accessed, and changing the initial order based upon the frequency that each shared content piece is accessed. For example, shared content pieces that are viewed with a higher frequency, according to the viewer orders stored in the data store, can be placed towards the front of the adjusted order. If, in the example described above, the personal web page owner's family viewed photo 15 more frequently than any other digital photograph in the wedding album, photo 15 would be moved to the first position in the wedding album thumbnail display. Likewise, shared content pieces that are viewed with a lower frequency can be placed towards the rear of the adjusted order. Therefore, if the personal web page owner's family did not view photo 2 a single time while viewing every other digital photograph in the wedding album, photo 2 would be moved to the last position in the wedding album thumbnail display.

The adjusted order can be based upon data aggregated from a plurality of viewers in the data store. Viewer orders and identities of individual viewers for a plurality of viewers can be received and stored in the data store. For example, a plurality of photo order files can be stored for the personal web page owner's family. These photo order files can include data such as the order that the photographs are accessed, the frequency the photographs are accessed (e.g., if the photographs are viewed multiple times at any given viewing, and/or if the family member visited the personal web page multiple times), and the names and group memberships for each individual family member (i.e., the individual family member's identity). At least one of the viewer orders and the identities of the individual viewers for the plurality of viewers can be analyzed, and initial order can be changed based at least in part upon at least one of the viewer orders and the identities of the individual viewers for the plurality of viewers, thereby providing a cumulative adjusted order. In an exemplary embodiment, the viewer orders retrieved from the data store can be used to determine the adjusted order. This means, for example, that the initial order can be changed if digital photographs towards the end of the initial order are viewed by the family members towards the beginning of their individual viewer orders (e.g., these photographs can be moved towards the beginning of the adjusted order).

Figure 3:
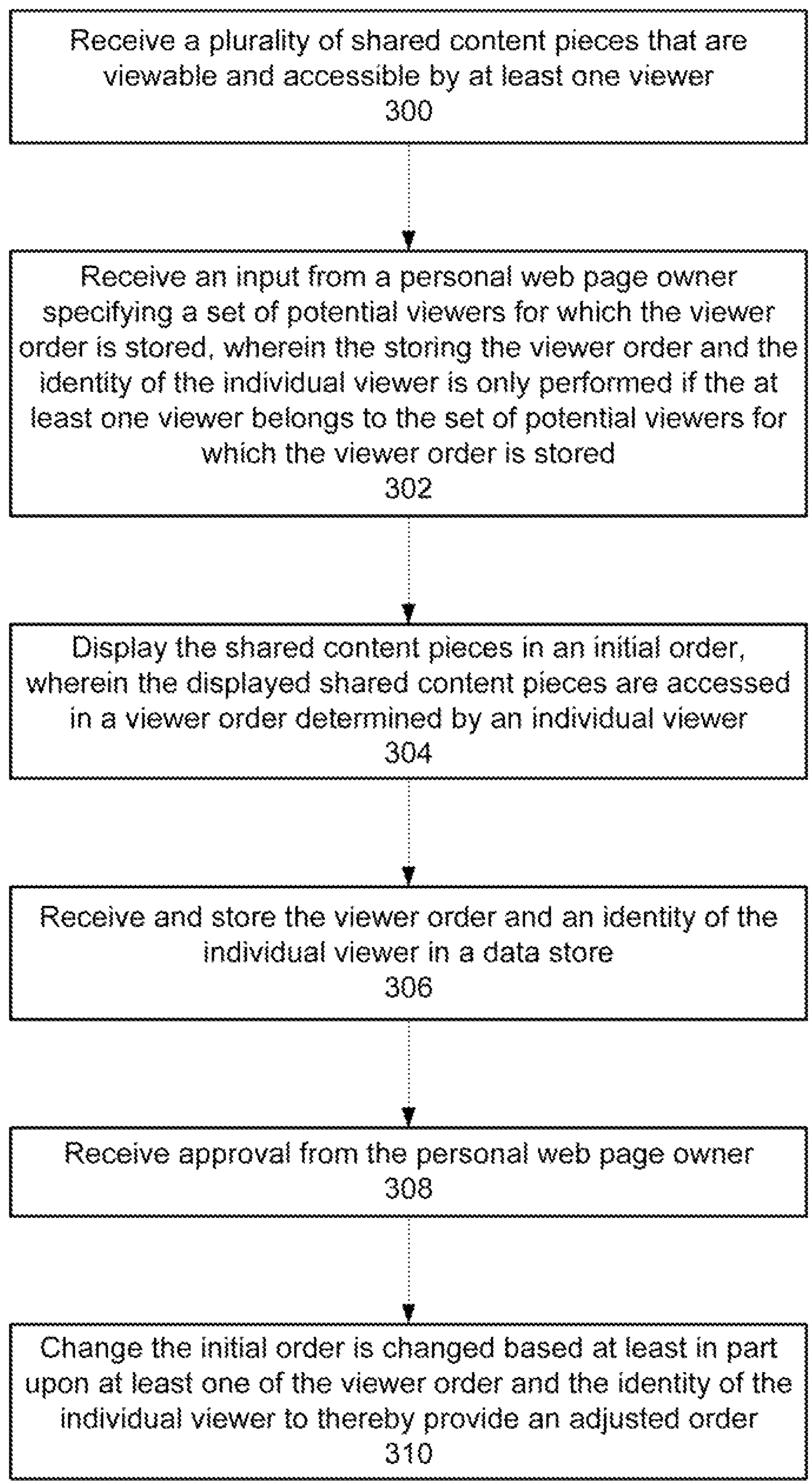
FIG. 3 illustrates another exemplary embodiment of a process for ordering content in social networking applications.

FIG. 3 illustrates another exemplary embodiment of a process for ordering content in social networking applications. A plurality of shared content pieces are received that are viewable and accessible by at least one viewer (block 300), as described above.

The plurality of shared content pieces can be received from a personal web page owner. In an exemplary embodiment, an input can be received from the personal web page owner specifying a set of potential viewers for which the viewer order is stored, wherein the storing the viewer order and the identity of the individual viewer is only performed if the at least one viewer belongs to the set of potential viewers for which the viewer order is stored (block 302). The input can include selecting individuals from the personal web page owners "friend list," selecting entire viewer groups, or any combination thereof Specifying a set of potential viewers for which the viewer order is stored can be desirable, for example, when the personal web page owner desires to allow the shared content pieces to be reordered only based on the input of certain viewers, and/or to allow the reordering only to affect viewers belonging to certain viewer groups. These viewer groups can include schools attended by the individual viewer, organizations to which the individual viewer belongs, or any group of users created by a user of the social networking application (e.g. family members, friends from a geographic region, etc.).

In an exemplary embodiment, the at least one viewer belongs to one or more viewer groups, wherein the adjusted order is provided only for the one or more viewer groups to which the at least one viewer belongs. In another exemplary embodiment, the at least one viewer belongs to two or more viewer groups, wherein the adjusted order is provided only for viewers that belong to all of the two or more viewer groups to which the at least one viewer belongs. In these, and similar embodiments, the personal web page owner can select which viewer group or groups receive the adjusted order.

The shared content pieces are displayed in an initial order, wherein the displayed shared content pieces are accessed in a viewer order determined by an individual viewer (block 304), as described above. Likewise, the viewer order and an identity of the individual viewer are received and stored into a data store (block 306), as described above.

The shared content pieces are displayed in an initial order, wherein the displayed shared content pieces are accessed in a viewer order determined by an individual viewer (block 304), as described above. Likewise, the viewer order and an identity of the individual viewer are received and stored into a data store (block 306), as described above.

The initial order is changed based at least in part upon at least one of the viewer order and the identity of the individual viewer, thereby providing an adjusted order (block 310), as described above.

In an exemplary embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention will also be described in the context of particular methods having certain steps. However, the method and system operate effectively for other methods having different and/or additional steps not inconsistent with the present invention.

A method and system for ordering content in social networking applications has been described. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the scope of the appended claims.

What is claimed is:

1. A method for ordering content in social networking applications, comprising:

receiving a plurality of shared content pieces that are viewable and accessible by at least one viewer;

displaying the shared content pieces in an initial order, wherein the displayed shared content pieces are accessed in a viewer order determined by an individual viewer;

receiving and storing the viewer order and an identity of the individual viewer in a data store; and changing the initial order based at least in part upon at least one of the viewer order and the identity of the individual viewer, thereby providing an adjusted order, wherein the changing of the initial order is performed after a predetermined period of time and is based at least in part upon at least one of viewer orders and identities of individual viewers for a plurality of viewers in the data store.

2. The method of claim 1 wherein the plurality of shared content pieces comprise digital photographs.

3. The method of claim 1 wherein the adjusted order is identical to the viewer order.

4. The method of claim 1 wherein the at least one viewer belongs to one or more viewer groups, wherein the adjusted order is provided only for the one or more viewer groups to which the at least one viewer belongs.

5. The method of claim 1 wherein the at least one viewer belongs to two or more viewer groups, wherein the adjusted order is provided only for viewers that belong to all of the two or more viewer groups to which the at least one viewer belongs.

6. The method of claim 1 wherein the shared content pieces are received from a personal web page owner, further comprising receiving an input from the personal web page owner specifying a set of potential viewers for which the viewer order is stored, wherein the storing the viewer order and the identity of the individual viewer is only performed if the at least one viewer belongs to the set of potential viewers for which the viewer order is stored.

7. The method of claim 1 wherein the changing the initial order comprises determining a frequency that each shared content pieces is accessed, and changing the initial order based upon the frequency that each shared content piece is accessed.

8. A system for ordering content in social networking applications, comprising:

a server; and a social networking application executing on the server, wherein the social networking application is configured to:

receive a plurality of shared content pieces that are viewable and accessible by at least one viewer, wherein the shared content pieces are configured for display in an initial order, wherein the shared content pieces are accessed in a viewer order determined by an individual viewer;

receive and store the viewer order and an identity of the individual viewer in a data store; and change the initial order at least in part upon at least one of the viewer order and the identity of the individual viewer, thereby providing an adjusted order, wherein the change of the initial order is performed after a predetermined period of time and is based at least in part upon at least one of viewer orders and identities of individual viewers for a plurality of viewers in the data store.

9. The system of claim 8 wherein the plurality of shared content pieces comprise digital photographs.

10. The system of claim 8 wherein the adjusted order is identical to the viewer order.

11. The system of claim 8 wherein the at least one viewer belongs to one or more viewer groups, wherein the adjusted order is provided only for the one or more viewer groups to which the at least one viewer belongs.

12. The system of claim 11 wherein the at least one viewer belongs to two or more viewer groups, wherein the adjusted order is provided only for viewers that belong to all of the two or more viewer groups to which the at least one viewer belongs.

13. The system of claim 8 wherein the plurality of shared content pieces are received from a personal web page owner, wherein the social networking application is further configured to receive an input from the personal web page owner specifying a set of potential viewers for which the viewer order is stored, wherein the storing the viewer order and the identity of the individual viewer is only performed if the at least one viewer belongs to the set of potential viewers for which the viewer order is stored.

14. The system of claim 8 wherein the social networking application is further configured to receive and store viewer orders and identities of individual viewers for a plurality of viewers in the data store, analyze at least one of the viewer orders and the identities of the individual viewers for the plurality of viewers, and change the initial order based at least in part upon at least one of the viewer orders and the identities of the individual viewers for the plurality of viewers.

15. The system of claim 8 wherein the social networking application is configured to change the initial order by determining a frequency that each shared content pieces is accessed, and changing the initial order based upon the frequency that each shared content piece is accessed.

16. The system of claim 8 wherein the plurality of shared content pieces are received from a personal web page owner, wherein the social networking application is further configured to receive approval from the personal web page owner before changing the initial order.

17. An executable software product stored on a computer-readable medium containing program instructions for ordering content in social networking applications, the program instructions for:

receiving a plurality of shared content pieces that are viewable and accessible by at least one viewer, wherein the shared content pieces are configured for display in an initial order, wherein the shared content pieces are accessed in a viewer order determined by an individual viewer;

receiving and storing the viewer order and an identity of the individual viewer in a data store; and changing the initial order based at least in part upon at least one of the viewer order and the identity of the individual viewer, thereby providing an adjusted order, wherein the changing of the initial order is performed after a predetermined period of time and is based at least in part upon at least one of viewer orders and identities of individual viewers for a plurality of viewers in the data store.

18. The executable software product of claim 17 wherein the plurality of shared content pieces comprise digital photographs.

19. The executable software product of claim 17 wherein the adjusted order is identical to the viewer order.

20. The executable software product of claim 17 wherein the at least one viewer belongs to one or more viewer groups, wherein the adjusted order is provided only for the one or more viewer groups to which the at least one viewer belongs.

21. The executable software product of claim 20 wherein the at least one viewer belongs to two or more viewer groups, wherein the adjusted order is provided only for viewers that belong to all of the two or more viewer groups to which the at least one viewer belongs.

22. The executable software product of claim 17 wherein the plurality of shared content pieces are received from a personal web page owner, further comprising program instructions for receiving an input from the personal web page owner specifying a set of potential viewers for which the viewer order is stored, wherein the storing the viewer order and the identity of the individual viewer is only performed if the at least one viewer belongs to the set of potential viewers for which the viewer order is stored.

23. A method for ordering content in social networking applications, comprising:

receiving a plurality of shared content pieces that are viewable and accessible by at least one viewer, wherein the shared content pieces are configured for display in an initial order, wherein the shared content pieces are accessed in a viewer order determined by an individual viewer;

receiving and storing the viewer order and an identity of the individual viewer in a data store; and changing the initial order based at least in part upon at least one of the viewer order and the identity of the individual viewer, thereby providing an adjusted order, wherein the changing of the initial order is performed after a predetermined period of time and is based at least in part upon at least one of viewer orders and identities of individual viewers for a plurality of viewers in the data store.

* * * * *